(12) United States Patent
Jo et al.

(10) Patent No.: US 7,939,573 B2
(45) Date of Patent: May 10, 2011

(54) MODIFIED BLOWING AGENT SURFACE-TREATED WITH METALLIC SILOXYLATED COMPOUND AND POLYMER RESIN COMPOSITION INCLUDING THE SAME

(75) Inventors: Yong Yon Jo, Siheung (KR); Heung Oh Son, Siheung (KR)

(73) Assignee: J & J Chemical Co. (KR)

( * ) Notice: Subject to any disclaimer, the term of this patent is extended or adjusted under 35 U.S.C. 154(b) by 655 days.

(21) Appl. No.: 11/873,195

(22) Filed: Oct. 16, 2007

(65) Prior Publication Data

US 2008/0090919 A1    Apr. 17, 2008

(30) Foreign Application Priority Data

Oct. 17, 2006 (KR) .................. 10-2006-0100991

(51) Int. Cl.
*C08J 9/06* (2006.01)

(52) U.S. Cl. ............... 521/86; 521/89; 521/91; 521/92; 521/93; 521/95; 428/403; 428/405; 428/407

(58) Field of Classification Search ............ 521/85, 521/86, 89, 91, 92, 93, 95; 428/403, 405, 428/407
See application file for complete search history.

(56) References Cited

U.S. PATENT DOCUMENTS

| | | |
|---|---|---|
| 3,055,846 A | 9/1962 | Flack et al. |
| 4,714,568 A | 12/1987 | Hurnik et al. |
| 6,399,201 B1 * | 6/2002 | Maekawa et al. ............ 428/403 |

FOREIGN PATENT DOCUMENTS

| | | |
|---|---|---|
| EP | 0943655 A1 | 9/1999 |
| EP | 1061110 A1 | 12/2000 |
| JP | 50087455 A | 7/1975 |
| JP | 56147833 A | 11/1981 |
| JP | 04-320432 | 11/1992 |
| JP | 4320432 A | 11/1992 |
| JP | 06-179862 | 6/1994 |
| JP | 6179862 A | 6/1994 |
| JP | 7011234 A | 1/1995 |
| JP | 7041590 A | 2/1995 |
| JP | 08-295872 | 11/1996 |
| JP | 8295872 A | 11/1996 |
| KR | 10-20050119375 | 12/2005 |
| SU | 1696441 A1 | 12/1991 |
| WO | 2005123750 A1 | 12/2005 |
| WO | 2005123826 A1 | 12/2005 |

OTHER PUBLICATIONS

Extended European Search Report, Jan. 15, 2008, 10 Pages.

* cited by examiner

*Primary Examiner* — Irina S Zemel
(74) *Attorney, Agent, or Firm* — St. Onge Steward Johnston & Reens LLC

(57) ABSTRACT

Provided is a modified blowing agent, wherein the surface of a blowing agent powder is coated with a metallic siloxylated compound. When the modified blowing agent is included in a polymer resin, dispersibility of the modified blowing agent is excellent in the polymer resin and fluidity of the polymer resin is improved in an extrusion molding machine and an injection molding machine, and thus productivity and processability can be improved. In addition, the foam that is formed using the polymer resin composition including the modified blowing agent has excellent tear strength, durability, and masking sound properties due to fine and uniform size of foam cells and increased number of foam cells per unit surface area.

5 Claims, No Drawings

MODIFIED BLOWING AGENT SURFACE-TREATED WITH METALLIC SILOXYLATED COMPOUND AND POLYMER RESIN COMPOSITION INCLUDING THE SAME

CROSS-REFERENCE TO RELATED APPLICATIONS

This application claims the benefit of Korean Patent Application No. 10-2006-0100991, filed on Oct. 17, 2006, in the Korean Intellectual Property Office, the disclosure of which is incorporated herein in its entirety by reference.

FIELD OF THE INVENTION

The present invention relates to a modified blowing agent and a polymer resin composition including the same, and more particularly, to a modified blowing agent having excellent dispersibility in a polymer resin and being able to improve fluidity of a polymer resin in an extrusion molding machine and a polymer resin composition including the blowing agent.

BACKGROUND OF THE INVENTION

Blowing agents, which are usually finely powdered compounds, are used to form foams such as thermoplastic resin foam. That is, the blowing agent is decomposed by heat and generates gases which forms pores within a resin to form foams.

Properties of cells of foams (foam cells), such as the size, distribution, and density, are determined by properties of the blowing agent, and physical properties of the foams such as durability and tear strength are affected by the properties of foam cells. The size of the foam cells needs to be decreased, the number of foam cells per unit surface area needs to be increased, cell size variation needs to be decreased, and the cells need to be uniformly distributed in order for the resultant foams to have excellent physical properties such as durability and tear strength. Thus, the blowing agent has an important role on in the formation of foams having excellent physical properties.

Conventionally, a method of treating a blowing agent with a surface treating agent such as a coupling agent has been used to improve the properties. The coupling agent may be an aluminum-based coupling agent, a silane-based coupling agent or a titanium-based coupling agent. For example, Japanese Patent Publication Nos. 1992-320432 and 1994-179862 disclose methods of improving fluidity and dispersibility in a resin by adding a silane coupling agent dissolved in a solvent to azo dicarbon amide. In addition, Japanese Patent Publication No. 1996-295872 discloses a method of improving fluidity and dispersibility in a resin by adding an aluminum coupling agent dissolved in a solvent to a chemical blowing agent.

Meanwhile, Korean Patent Application No. 2005-0119375 discloses a method of improving properties of foams by adding a silane compound as an additive to a polymer resin in addition to a blowing agent during the formation of a polymer resin.

However, effects of the conventional methods are not sufficient, and thus methods of improving the effects need to be developed.

SUMMARY OF THE INVENTION

The present invention provides a modified blowing agent surface-treated with a metallic siloxylated compound having excellent dispersibility in a polymer resin and being able to improve fluidity of a polymer resin in an extrusion molding machine or an injection molding machine.

The present invention also provides a polymer resin composition including the modified blowing agent.

According to an aspect of the present invention, there is provided a modified blowing agent, wherein the surface of a blowing agent powder is coated with a metallic siloxylated compound.

The metallic siloxylated compound may be represented by one compound selected from the group consisting of Formula 1 having a molecular weight of 5,000 to 40,000, Formula 2 having a molecular weight of 5,000 to 30,000, and Formula 3 having a molecular weight of 10,000 to 40,000:

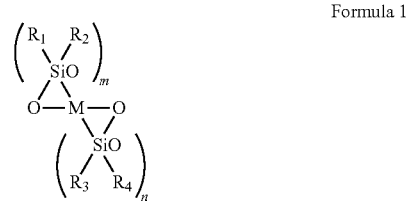

Formula 1 wherein, m and n are each independently an integer of from 4 to 100,

M is a metal selected from the group consisting of aluminum, arsenic, gold, boron, barium, beryllium, bismuth, calcium, niobium, cadmium, cerium, cobalt, chrome, cesium, copper, iron, gallium, germanium, mercury, indium, potassium, lanthanum, lithium, magnesium, manganese, molybdenum, iridium, sodium, nickel, osmium, lead, palladium, platinum, rubidium, rhodium, ruthenium, antimony, silicon, tin, strontium, tantalum, tellurium, thorium, titanium, thallium, uranium, vanadium, tungsten, zinc and zirconium, and $R_1$, $R_2$, $R_3$ and $R_4$ are each independently selected the group consisting of: a hydrogen atom; a halogen atom; —Si(R')(R")(R'''); a $C_1$~$C_6$ alkyl group substituted or unsubstituted with at least one of a halogen atom and —Si(R')(R")(R'''); a $C_2$~$C_6$ alkenyl group substituted or unsubstituted with at least one of a halogen atom and —Si(R')(R")(R'''); and a phenyl group substituted or unsubstituted with at least one of a halogen atom and —Si(R')(R")(R'''), wherein R', R" and R''' are each independently a $C_1$~$C_6$ alkyl group;

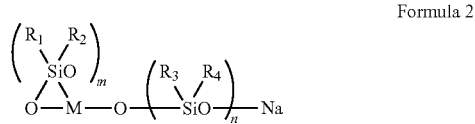

Formula 2 wherein m and n are each independently an integer of from 4 to 100,

M is a metal selected from the group consisting of aluminum, arsenic, gold, boron, barium, beryllium, bismuth, calcium, niobium, cadmium, cerium, cobalt, chrome, cesium, copper, iron, gallium, germanium, mercury, indium, potassium, lanthanum, lithium, magnesium, manganese, molybdenum, iridium, sodium, nickel, osmium, lead, palladium, platinum, rubidium, rhodium, ruthenium, antimony, silicon, tin, strontium, tantalum, tellurium, thorium, titanium, thallium, uranium, vanadium, tungsten, zinc and zirconium, and $R_1$, $R_2$, $R_3$ and $R_4$ are each independently selected the group consisting of: a hydrogen atom; a halogen atom; —Si (R')(R")(R'''); a $C_1$~$C_6$ alkyl group substituted or unsubstituted with at least one of a halogen atom and —Si(R')(R")(R'''); a $C_2$~$C_6$ alkenyl group substituted or unsubstituted with at least one of a halogen atom and —Si(R')(R")(R'''); and a phenyl group substituted or unsubstituted with at least one of a halogen atom and —Si(R')(R")(R'''), wherein R', R" and R''' are each independently a $C_1$~$C_6$ alkyl group; and

Formula 3 wherein,
A is

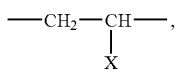

B is —$CH_2CH_2$—,
wherein X is $CH_3(SiO-2CH_2-M)_m$-, wherein m is an integer of from 4 to 100, M is a metal selected from the group consisting of aluminum, arsenic, gold, boron, barium, beryllium, bismuth, calcium, niobium, cadmium, cerium, cobalt, chrome, cesium, copper, iron, gallium, germanium, mercury, indium, potassium, lanthanum, lithium, magnesium, manganese, molybdenum, iridium, sodium, nickel, osmium, lead, palladium, platinum, rubidium, rhodium, ruthenium, antimony, silicon, tin, strontium, tantalum, tellurium, thorium, titanium, thallium, uranium, vanadium, tungsten, zinc and zirconium, each of the repeating units of A and B are randomly connected, a and b are each independently 10 to 90 mol %, and 1<n<1000.

The amount of the metallic siloxylated compound may be from 0.1 to 10 parts by weight based on 100 parts by weight of the blowing agent.

The blowing agent may be at least one compound selected from the group consisting of azo dicarbon amide, p,p'-oxybis(benzenesulfonyl hydrazide), p-toluenesulfonyl hydrazide, benzenesulfonyl hydrazide, N,N'-dinitroso pentamethylene tetramine, p-toluenesulfonyl semicarbazide, 5-phenyltetrazol, sodium bicarbonate, zinc dibenzenesulfinate and zinc ditoluenesulfinate.

The modified blowing agent may further include fumed silica.

According to another aspect of the present invention, there is provided a polymer resin composition comprising the modified blowing agent, wherein the amount of the modified blowing agent is from 0.1 to 30 parts by weight based on 100 parts by weight of a polymer resin.

The polymer resin may be at least one resin selected from the group consisting of polyvinyl chloride, polyethylene, polypropylene, ethylenevinylacetate resin, polyurethane, polystyrene, acrylonitrile butadiene styrene (ABS) resin, oleffin resin, rubber, phenol resin, melamine resin and epoxy resin.

When the modified blowing agent according to the present invention is included in a polymer resin, dispersibility of the modified blowing agent is excellent in the polymer resin and fluidity of the polymer resin is improved in an extrusion molding machine and injection molding machine. In addition, foams formed by the polymer resin composition including the modified blowing agent have excellent properties due to fine and uniform size of foam cells and increased number of foam cells per unit surface area.

DETAILED DESCRIPTION OF THE INVENTION

Hereinafter, a modified blowing agent and a polymer resin composition including the modified blowing agent according to the present invention will now be described in more detail.

In a modified blowing agent according to the present invention, the surface of the modified blowing agent is coated with a metallic siloxylated compound. That is, the modified blowing agent is prepared by coating a metallic siloxylated compound on the surface of a known blowing agent such as azo dicarbon amide powder.

Here, the metallic siloxylated compound indicates a compound including a siloxane bond (Si—O bond) and at least one metal. After treatment of the metallic siloxylated compound mixed with a blowing agent, the metallic siloxylated compound surrounds the surface of the blowing agent.

The modified blowing agent coated with the metallic siloxylated compound has improved fluidity and dispersibility within a polymer resin. Thus, fluidity of the polymer resin composition including the modified blowing agent can also be improved. As a result, when polymer products are formed using the polymer resin composition, fluidity of the polymer resin is improved in extrusion molding machine, injection molding machine or the like, and thus processibility of the polymer resin composition including the modified blowing agent can be improved.

The siloxane has water repellent properties in the metallic siloxylated compound of the modified blowing agent, and thus solidification of the blowing agent is prevented.

The metallic siloxylated compound may be represented by Formula 1 having a molecular weight of 5,000 to 40,000, Formula 2 having a molecular weight of 5,000 to 30,000, or Formula 3 having a molecular weight of 10,000 to 40,000.

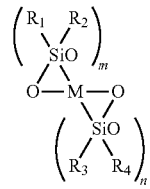

Formula 1

Here, m and n are each independently an integer of from 4 to 100;

M is a metal selected from the group consisting of aluminum, arsenic, gold, boron, barium, beryllium, bismuth, calcium, niobium, cadmium, cerium, cobalt, chrome, cesium, copper, iron, gallium, germanium, mercury, indium, potassium, lanthanum, lithium, magnesium, manganese, molybdenum, iridium, sodium, nickel, osmium, lead, palladium, platinum, rubidium, rhodium, ruthenium, antimony, silicon, tin, strontium, tantalum, tellurium, thorium, titanium, thallium, uranium, vanadium, tungsten, zinc and zirconium; and $R_1$, $R_2$, $R_3$ and $R_4$ are each independently selected the group consisting of: a hydrogen atom; a halogen atom; —Si(R')(R")(R'''); a $C_1$~$C_6$ alkyl group substituted or unsubstituted with at least one of a halogen atom and —Si(R')(R")(R'''); a $C_2$~$C_6$ alkenyl group substituted or unsubstituted with at least one of a halogen atom and —Si(R')(R")(R'''); and a phenyl group substituted or unsubstituted with at least one of a halogen atom and —Si(R')(R")(R'''), wherein R', R" and R''' are each independently a $C_1$~$C_6$ alkyl group.

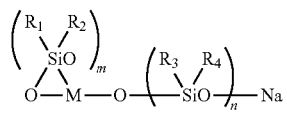

Formula 2

Here, m and n are each independently an integer of from 4 to 100;

M is a metal selected from the group consisting of aluminum, arsenic, gold, boron, barium, beryllium, bismuth, calcium, niobium, cadmium, cerium, cobalt, chrome, cesium, copper, iron, gallium, germanium, mercury, indium, potassium, lanthanum, lithium, magnesium, manganese, molybdenum, iridium, sodium, nickel, osmium, lead, palladium, platinum, rubidium, rhodium, ruthenium, antimony, silicon, tin, strontium, tantalum, tellurium, thorium, titanium, thallium, uranium, vanadium, tungsten, zinc and zirconium; and $R_1$, $R_2$, $R_3$ and $R_4$ are each independently selected the group consisting of: a hydrogen atom; a halogen atom; —Si(R')(R'')(R'''); a $C_1$~$C_6$ alkyl group substituted or unsubstituted with at least one of a halogen atom and —Si(R')(R'')(R'''); a $C_2$~$C_6$ alkenyl group substituted or unsubstituted with at least one of a halogen atom and —Si(R')(R'')(R'''); and a phenyl group substituted or unsubstituted with at least one of a halogen atom and —Si(R')(R'')(R'''), wherein R', R'' and R''' are each independently a $C_1$~$C_6$ alkyl group.

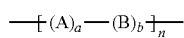

Formula 3

Here,
A is

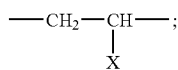

B is —$CH_2$—$CH_2$—;

wherein X is $CH_3(SiO-2CH_2-M)_m$-, wherein m is an integer of from 4 to 100,

M is a metal selected from the group consisting of aluminum, arsenic, gold, boron, barium, beryllium, bismuth, calcium, niobium, cadmium, cerium, cobalt, chrome, cesium, copper, iron, gallium, germanium, mercury, indium, potassium, lanthanum, lithium, magnesium, manganese, molybdenum, iridium, sodium, nickel, osmium, lead, palladium, platinum, rubidium, rhodium, ruthenium, antimony, silicon, tin, strontium, tantalum, tellurium, thorium, titanium, thallium, uranium, vanadium, tungsten, zinc and zirconium, each of the repeating units of A and B are randomly connected;

a and b are each independently 10 to 90 mol %;

$1 < n \leq 1000$.

The metallic siloxylated compound coated on the surface of the modified blowing agent may be represented by Formula 1, Formula 2, or Formula 3, wherein M is aluminum or boron. In this case, the modified blowing agent is not toxic.

Any known blowing agent in the art can be used as the blowing agent used to prepared the modified blowing agent without limitation. In particular, an organic and inorganic chemical blowing agent can be used, and examples of the blowing agent is azo dicarbon amide (ADCA), p,p'-oxybis (benzenesulfonyl hydrazide), p-toluenesulfonyl hydrazide, benzenesulfonyl hydrazide, N,N'-dinitroso pentamethylene tetramine, p-toluenesulfonyl semicarbazide, 5-phenyltetrazol, sodium bicarbonate, zinc dibenzenesulfinate and zinc ditoluenesulfinate. The blowing agent can be used alone or in a combination of one or more. In particular, when ADCA is used as the blowing agent, the blowing agent can be modified by a variety of post-processings.

The blowing agent may be in a powder form. The blowing agent may have a particle diameter of 2 to 30 μm, but the particle diameter is not limited. Here, the particle diameter is a central diameter measured by a laser diffraction-type particle size distribution system.

The modified blowing agent includes 0.1 to 10 parts by weight of the metallic siloxylated compound based on 100 parts by weight of the blowing agent. When the amount of the metallic siloxylated compound is less than 0.1 parts by weight based on 100 parts by weight of the blowing agent 100 parts by weight, physical properties of the modified blowing agent is not sufficiently improved. On the other hand, when the amount of the metallic siloxylated compound is greater than 10 parts by weight, a melting index (MI) of a resin is excessively varied and viscosity is increased, and thus fluidity of the modified blowing agent may be decrease.

In addition, the modified blowing agent may further include fumed silica. The fumed silica is a porous inorganic material having particle shape in order to enlarge the surface area. When the amount of the fumed silica is increased in the modified blowing agent, fluidity may be increased, and caking can be more effectively prevented.

The amount of the fumed silica may be from 0.1 to 5.0 parts by weight based on 100 parts by weight of the blowing agent. When the amount of the fumed silica is less than 0.1 parts by weight based on 100 parts by weight of the blowing agent, the effect of the fumed silica, that is, improvement of fluidity and prevention of caking, is negligible. On the other hand, when the amount of the fumed silica is greater than 5.0 parts by weight, the residual fumed silica may generate pin holes or roughen cells.

Hereinafter, a method of preparing a modified blowing agent according to the present invention will be described in detail.

First, a metallic siloxylated compound, for example, a metallic siloxylated compound represented by Formula 1, is added to a known blowing agent powder, and they are uniformly mixed. The mixture is dried at a temperature from 40 to 90° C. for 30 minutes to 2 hours to prepare a modified blowing agent according to the present invention. Here, the blowing agent is sufficiently mixed with the metallic siloxylated compound such that the metallic siloxylated compound is uniformly distributed on the surface of the blowing agent. A mixing device used herein may be a screw type mixer such as a super mixer, a Henschel mixer, and a Nauter mixer; a proshare mixer and a ribbon blender, but is not limited thereto.

In addition, the metallic siloxylated compound may be added to a blowing agent in a form of a dry powder (dry process) or a blowing agent in a form of wet cake (wet process). Here, the metallic siloxylated compound can be added with or without being diluted. A dilution solvent may be an aliphatic hydrocarbon or an aliphatic alcohol, such as n-hexane, methanol, ethanol or isopropylalcohol, but is not limited thereto. When a spray nozzle is used, the metallic siloxylated compound can be uniformly distributed on the entire surface of the blowing agent powder, and thus dispersibility can be improved.

A polymer resin composition including the modified blowing agent will be described.

As described above, a polymer resin composition including the modified blowing agent includes 0.1 to 30 parts by weight of the modified blowing agent based on 100 parts by weight of a polymer resin. When the amount of the modified blowing agent is less than 0.1 parts by weight based on 100 parts by weight of the polymer resin, the blowing effect is negligible. On the other hand, when the amount of the modified blowing agent is greater than 30 parts by weight, physical properties of the resultant foams may be decreased, and thus foam cells cannot be uniformly formed.

The polymer resin used to prepared the polymer resin composition may include polyvinyl chloride, polyethylene, polypropylene, ethylenevinylacetate resin, polyurethane, polystyrene, acrylonitrile butadiene styrene (ABS) resin, oleffin resin, rubber, phenol resin, melamine resin and epoxy resin, but is not limited thereto. Examples of the rubber may be a natural rubber (NR) or a synthetic rubber such as polyisoprene, acrylonitrile butadien rubber (NBR), styrene-butadiene rubber (SBR), neoprene, and ethylene propylene rubber (EPDM and EPM).

The polymer resin composition including the modified blowing agent according to the present invention has improved fluidity. Thus, processability of the polymer resin composition including the modified blowing agent according to the present invention is improved during the formation of the polymer resin. As a result of improved fluidity and processability of the polymer resin composition including the modified blowing agent, productivity of the polymer resin blowing process can be improved.

Meanwhile, the modified blowing agent has excellent dispersibility in a polymer resin as described above. Thus, foams formed by the polymer resin composition have very fine and uniform cells and the number of foam cells per unit surface area is increased, and physical properties of the foams such as durability and tear strength can be improved. Therefore, the foams formed by the polymer resin composition including the modified blowing agent can have uniform and improved physical properties.

The polymer resin composition may further include a variety of additives in addition to the modified blowing agent. Examples of the additives are a plasitizer, a stabilizer, a lubricant, a coloring agent, an antifoaming agent, and a filler. The plasticizer may be phthalate ester, adiphate ester, or the like; the stabilizer may be Ca-stearate, tribasic lead sulfate, urea, or the like; the lubricant may be stearic acid, or the like; the coloring agent may be chrome yellow, carbon black, or the like; the antifoaming agent may be maleic acid, or the like; and the filler may be the fumed silica, silica, alumina, titanium dioxide, calcium carbonate, or the like.

The present invention will now be described in greater detail with reference to the following examples. The following examples are for illustrative purposes only and are not intended to limit the scope of the invention.

EXAMPLES

Blowing agents used to prepare a polymer resin composition were prepared according to Comparative Examples 1 to 4 and Examples 1 to 11.

Comparative Example 1

Untreated pure azo dicarbon amide powder having an average particle diameter of 15 μm was prepared.

Comparative Example 2

0.2 g of AL-M (Ajinomoto Company) as an aluminum-based coupling agent was added to 100 g of the azo dicarbon amide powder used in Comparative Example 1. The mixture was dried by heat-treatment at 70° C. for 2 hours and passed through a 200 mesh sieve to obtain a powder.

Comparative Example 3

0.2 g of TTS (Ajinomoto Company) as a titanium-based coupling agent was added to 100 g of the azo dicarbon amide powder used in Comparative Example 1. The mixture was dried by heat-treatment at 70° C. for 2 hours and passed through a 200 mesh sieve to obtain a powder.

Comparative Example 4

0.2 g of trimethoxysilane (GE Company) as a silane-based coupling agent was added to 100 g of the azo dicarbon amide powder used in Comparative Example 1. The mixture was dried by heat-treatment at 70° C. for 2 hours, and passed through a 200 mesh sieve to obtain a powder.

Example 1

0.2 g of SC-101-a (Silochem CO. LTD)) which is represented by Formula 1 (wherein $R_1$, $R_2$, $R_3$ and $R_4$ are hydrogen atoms, and M is boron) and has a molecular weight of about from 7,000 to 8,000 and viscosity of about 100,000 cP or higher as a metallic siloxylated compound was diluted in 1 g of n-hexane, and the diluted solution was added to 100 g of the azo dicarbon amide powder used in Comparative Example 1. The mixture was dried by heat-treatment at 70° C. for 2 hours and passed through a 200 mesh sieve to obtain a modified azo dicarbon amide powder.

Example 2

0.2 g of SC-101-10 (Silochem CO. LTD) which is represented by Formula 1 (wherein $R_1$, $R_2$, $R_3$ and $R_4$ are hydrogen atoms, and M is boron) and has a molecular weight of about 15,000 and viscosity of about 50,000 cP as a metallic siloxylated compound was diluted in 1 g of n-hexane, and the diluted solution was added to 100 g of the azo dicarbon amide powder used in Comparative Example 1. The mixture was dried by heat-treatment at 70° C. for 2 hours and passed through a 200 mesh sieve to obtain a modified azo dicarbon amide powder.

Example 3

0.2 g of 100MSM28 (Silochem CO. LTD) which is represented by Formula 1 (wherein $R_1$, $R_2$, $R_3$ and $R_4$ are hydrogen atoms, and M is boron) and has a molecular weight of about 35,000 and viscosity of about 30,000 cP as a metallic siloxylated compound was diluted in 1 g of n-hexane, and the diluted solution was added to 100 g of the azo dicarbon amide powder used in Comparative Example 1. The mixture was dried by heat-treatment at 70° C. for 2 hours and passed through a 200 mesh sieve to obtain a modified azo dicarbon amide powder.

Example 4

0.2 g of MSM55 (Silochem CO. LTD) which is represented by Formula 1 (wherein $R_1$, $R_2$, $R_3$ and $R_4$ are hydrogen atoms, and M is boron) and has a molecular weight of about from 20,000 to 35,000 and viscosity of about 100,000 cP or higher as a metallic siloxylated compound was diluted in 1 g of n-hexane, and the diluted solution was added to 100 g of the azo dicarbon amide powder used in Comparative Example 1. The mixture was dried by heat-treatment at 70° C. for 2 hours and passed through a 200 mesh sieve to obtain a modified azo dicarbon amide powder.

Example 5

0.2 g of SC-011 (Silochem CO. LTD) which is represented by Formula 1 (wherein $R_1$, $R_2$, $R_3$ and $R_4$ are hydrogen atoms, and M is boron) and has a molecular weight of about 10,000 and viscosity of about 100,000 cP or higher as a metallic siloxylated compound was diluted in 1 g of n-hexane, and the diluted solution was added to 100 g of the azo dicarbon amide powder used in Comparative Example 1. The mixture was dried by heat-treatment at 70° C. for 2 hours and passed through a 200 mesh sieve to obtain a modified azo dicarbon amide powder.

Example 6

0.2 g of SC-S3 (Silochem CO. LTD) which is represented by Formula 2 (wherein $R_1$, $R_2$, $R_3$ and $R_4$ are hydrogen atoms, and M is boron) and has a molecular weight of about 10,000 and viscosity of about 100,000 cP or higher as a metallic siloxylated compound was diluted in 1 g of isopropylalcohol, and the diluted solution was added to 100 g of the azo dicarbon amide powder used in Comparative Example 1. The mixture was dried by heat-treatment at 70° C. for 2 hours and passed through a 200 mesh sieve to obtain a modified azo dicarbon amide powder.

Example 7

0.2 g of SC-CFA (Silochem CO. LTD) which is represented by Formula 3 (wherein M is boron) and has a molecular weight of about 15,000 and viscosity of about 800 cP as a metallic siloxylated compound was added to 100 g of the azo dicarbon amide powder used in Comparative Example 1. The mixture was dried by heat-treatment at 70° C. for 2 hours and passed through a 200 mesh sieve to obtain a modified azo dicarbon amide powder.

Example 8

0.2 g of SC-CFB (Silochem CO. LTD) which is represented by Formula 3 (wherein M is boron) and has a molecular weight of about 30,000 and viscosity of about 300 cP as a metallic siloxylated compound was added to 100 g of the azo dicarbon amide powder used in Comparative Example 1. The mixture was dried by heat-treatment at 70° C. for 2 hours and passed through a 200 mesh sieve to obtain a modified azo dicarbon amide powder.

Example 9

0.2 g of 100MS28 (Silochem CO. LTD) which is represented by Formula 1 (wherein $R_1$, $R_2$, $R_3$ and $R_4$ are hydrogen atoms, and M is boron) and has a molecular weight of about 15,000 and viscosity of about 350 cP as a metallic siloxylated compound was added to 100 g of the azo dicarbon amide powder used in Comparative Example 1. The mixture was dried by heat-treatment at 70° C. for 2 hours and passed through a 200 mesh sieve to obtain a modified azo dicarbon amide powder.

Example 10

0.2 g of SC-101-10 (Silochem CO. LTD) which is represented by Formula 1 (wherein $R_1$, $R_2$, $R_3$ and $R_4$ are hydrogen atoms, and M is boron) and has a molecular weight of about 15,000 and viscosity of about 50,000 cP as a metallic siloxylated compound was diluted in 1 g of n-hexane and the diluted solution was added to 100 g of the azo dicarbon amide powder used in Comparative Example 1. Then, 0.2 g of fumed silica was added thereto. The mixture was dried by heat-treatment at 70° C. for 2 hours and passed through a 200 mesh sieve to obtain a modified azo dicarbon amide powder.

Example 11

0.2 g of MSM55 (Silochem CO. LTD) which is represented by Formula 1 (wherein $R_1$, $R_2$, $R_3$ and $R_4$ are hydrogen atoms, and M is boron) and has a molecular weight of about from 20,000 to 35,000 and viscosity of about 100,000 cP or higher as a metallic siloxylated compound was diluted in 1 g of n-hexane and the diluted solution was added to 100 g of the azo dicarbon amide powder used in Comparative Example 1. Then, 0.2 g of fumed silica was added thereto. The mixture was dried by heat-treatment at 70° C. for 2 hours and passed through a 200 mesh sieve to obtain a modified azo dicarbon amide powder.

Measurement of Physical Properties

Properties of the resultants obtained in Examples 1 to 11 and Comparative Examples 1 to 4 were measured using the following methods.

1) Decomposition Properties

A decomposition temperature (GT) and decomposition speed (DS) of the blowing agent powder and a volume of gas (GV) generated during the decomposition were measured at 195□ using a decomposition temperature measuring device produced by Cell Techno (Japan) (Model No.: FI-99□S□Q1-37).

In order to measure the DT, test initiating temperatures suitable for each of the samples were set by referring to test initiating temperatures listed in the test standard index of blowing agents (DJO-SPR-Q1-01, -02). A heating bath was heated at a constant heating rate, a sample of the blowing agent was weighed, and the weighed sample was heated and decomposed in the heating bath. A temperature and generated gas were measured after 30 seconds, and a temperature at which the amount of generated gas reaches 100 ml/gr is regarded as the decomposition temperature.

The amount of decomposed gas was measured by heating the sample to a temperature prescribed in the test standard index of blowing agents (DJO-SPR-Q1-01, -02).

The decomposition speed was measured by placing a test tube in the heating bath in the same manner as in the test of the decomposition temperature, sealing the test tube after 30 seconds, and measuring variation of the amount of gas at every 30 seconds. The results are shown in Table 1.

2) Angle of Repose

Angle of repose is an angle formed between the horizontal plane and the plane of inclination of pile of granular materials at which the granular materials come to rest. The angle of repose increases with increasing roughness and nonuniformity of the surface of the granule. Thus, a small angle of repose indicates excellent fluidity of powder.

Angle of repose of the blowing agent powder prepared in Examples 1 to 11 and Comparative Examples 1 to 4 was measured using a powder tester (Hosokawa Micron Ltd., Product No.: FI-93□S□Q1-25, Model No.: PT-N).

3) Melt Flow Test 21 g of each of the blowing agent samples obtained in Examples 1 to 11 and Comparative Examples 1 to 4 was mixed with 100 g of low-density polyethylene (Hanwha Chemical Corporation, Product No.: PE 5316) using a heating-roller at 120° C., and a sheet of the mixture was molded using a press mold at 130° C. Melt flow test of the formed sheets was performed.

That is, melt flow of sheets prepared using the blowing agent of Examples 1 to 11 and Comparative Examples 1 to 4 was measured using a plastometer (Tinius Olesen Ltd., Model No.: MT 600) under 10.76 Kg load at 125° C.

4) Foam Test

A sheet was prepared in the same manner as the sheet used to measure the melting flow was prepared, except that 21 g of each of the blowing agent samples was mixed with 100 g of low-density polyethylene (Hanwha Chemical Corporation, Product No.: PE 5316), and 0.9 g of dicumyl peroxide (DCP) as a chemical cross-linking agent was further added thereto. Foam test was performed by foaming the prepared sheet in an oven at 210° C.

The size of foam cells prepared in Examples 1 to 11 and Comparative Examples 1 to 4, cell size variation, and the number of cells per unit surface area were measured.

The results are shown in Table 1.

TABLE 1

|  | Decomposition properties | | | Angle of repose(°) | Melt flow (g/10 sec.) | Blowing test | | |
|---|---|---|---|---|---|---|---|---|
|  | DT(° C.) | GV(ml/g) | DS(sec.) |  |  | Cell size (mm) | Cell size variation | No. of cells per 1 cm² |
| Comparative Example 1 | 210 | 232 | 750 | 50.0 | 0.754 | 0.728 | $5.97 \times 10^{-2}$ | 240 |
| Comparative Example 2 | 209 | 232 | 720 | 48.0 | 0.765 | 0.824 | $1.23 \times 10^{-2}$ | 188 |
| Comparative Example 3 | 210 | 234 | 756 | 48.3 | 0.754 | 0.814 | $1.49 \times 10^{-2}$ | 192 |
| Comparative Example 4 | 210 | 234 | 722 | 46.0 | 0.774 | 0.692 | $3.25 \times 10^{-2}$ | 266 |
| Example 1 | 210 | 230 | 756 | 47.1 | 0.834 | 0.588 | $6.08 \times 10^{-3}$ | 368 |
| Example 2 | 210 | 234 | 753 | 49.9 | 0.802 | 0.618 | $2.48 \times 10^{-3}$ | 334 |
| Example 3 | 210 | 234 | 746 | 47.0 | 0.799 | 0.696 | $3.52 \times 10^{-3}$ | 263 |
| Example 4 | 209 | 230 | 738 | 50.0 | 0.877 | 0.564 | $6.72 \times 10^{-3}$ | 400 |
| Example 5 | 210 | 236 | 754 | 47.6 | 0.823 | 0.540 | $1.20 \times 10^{-2}$ | 437 |
| Example 6 | 210 | 236 | 754 | 47.3 | 0.810 | 0.630 | $8.00 \times 10^{-3}$ | 321 |
| Example 7 | 210 | 236 | 763 | 47.4 | 0.787 | 0.564 | $4.32 \times 10^{-3}$ | 400 |
| Example 8 | 210 | 235 | 762 | 47.1 | 0.778 | 0.552 | $5.28 \times 10^{-3}$ | 418 |
| Example 9 | 209 | 232 | 748 | 48.9 | 0.837 | 0.614 | $2.92 \times 10^{-3}$ | 338 |
| Example 10 | 210 | 232 | 751 | 44.2 | 0.807 | 0.620 | $2.21 \times 10^{-3}$ | 331 |
| Example 11 | 209 | 232 | 740 | 43.0 | 0.880 | 0.554 | $6.50 \times 10^{-3}$ | 415 |

As shown in Table 1, the modified blowing agents prepared in Examples 1 to 11 according to the present invention have equal level of decomposition properties and equal or lower level of angle of repose compared to the blowing agents prepared in Comparative Examples 1 to 4. The results indicate that the modified blowing agents of Examples 1 to 11 have appropriate decomposition properties and equal or improved level of fluidity when compared to the known blowing agents.

The melt flow of the polymer resin composition including the modified blowing agent prepared in Examples 1 to 11 according to the present invention increased compared to Comparative Examples 1 to 4. The results indicate that fluidity of the polymer resin composition including the modified blowing agent prepared in Examples 1 to 11 increased.

In addition, according to the foam test, the cell size of foam using the modified blowing agent prepared in Examples 1 to 11 according to the present invention decreased when compared to the cell size of Comparative Examples 1 to 4, and cell size variation decreased. Thus, uniform cells were formed, and the number of cells per unit surface area increased. The results indicate that fine and uniform foam cells can be formed and more number foam cells can be formed when foam is prepared using the polymer resin composition including the modified blowing agent according to the present invention. Therefore, the foam that is formed using the polymer resin composition including the modified blowing agent according to the present invention has improved tear strength, durability, and masking sound properties.

As described above, when the modified blowing agent according to the present invention is included in the polymer resin, dispersibility of the modified blowing agent is excellent in the polymer resin and fluidity of the polymer resin is improved in an extrusion molding machine and an injection molding machine. In addition, the foam that is formed using the polymer resin composition including the modified blowing agent according to the present invention has excellent tear strength, durability, and masking sound properties due to fine and uniform size of foam cells and increased number of foam cells per unit surface area.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A modified blowing agent, wherein the surface of a blowing agent powder is coated with a metallic siloxylated compound.

2. The modified blowing agent of claim 1, wherein the metallic siloxylated compound is represented by one compound selected from the group consisting of Formula 1 having a molecular weight of 5,000 to 40,000, Formula 2 having a molecular weight of 5,000 to 30,000, and Formula 3 having a molecular weight of 10,000 to 40,000:

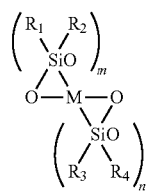

Formula 1 wherein m and n are each independently an integer of from 4 to 100,

M is a metal selected from the group consisting of aluminum, boron, cerium, germanium, manganese, iridium, osmium, lead, palladium, platinum, rhodium, silicon, tin, tellurium, thorium, titanium, uranium, vanadium, and zirconium, and $R_1$, $R_2$, $R_3$ and $R_4$ are each independently selected the group consisting of: a hydrogen atom; a halogen atom; —Si(R')(R")(R"'); a $C_1$~$C_6$ alkyl group substituted or unsubstituted with at least one of a halogen atom and —Si(R')(R")(R"'); a $C_2$~$C_6$ alkenyl group substituted or unsubstituted with at least one of a halogen atom and —Si(R')(R")(R"'); and a phenyl group substituted or unsubstituted with at least one of a halogen atom and —Si(R')(R")(R"'), wherein R', R" and R"' are each independently a $C_1$~$C_6$ alkyl group;

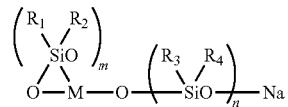

Formula 2 wherein m and n are each independently an integer of from 4 to 100,

M is a metal selected from the group consisting of aluminum, arsenic, gold, boron, bismuth, niobium, cerium, cobalt, chrome, iron, gallium, indium, lanthanum, manganese, iridium, nickel, osmium, rhodium, ruthenium, antimony, titanium, thallium, uranium, and vanadium, $R_1$, $R_2$, $R_3$ and $R_4$ are each independently selected the group consisting of: a hydrogen atom; a halogen atom; —Si(R')(R")(R"'); a $C_1$~$C_6$ alkyl group substituted or unsubstituted with at least one of a halogen atom and —Si(R')(R")(R"'); a $C_2$~$C_6$ alkenyl group substituted or unsubstituted with at least one of a halogen atom and —Si(R')(R")(R"'); and a phenyl group substituted or unsubstituted with at least one of a halogen atom and —Si(R')(R")(R"'), wherein R', R" and R"' are each independently a $C_1$~$C_6$ alkyl group; and

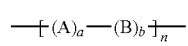

Formula 3 wherein
A is

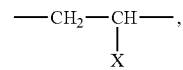

B is —$CH_2$—$CH_2$—,
wherein X is

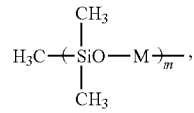

wherein m is an integer of from 4 to 100,

M is a metal selected from the group consisting of barium, beryllium, calcium, cadmium, cobalt, chrome, copper, iron, germanium, mercury, magnesium, nickel, lead, palladium, platinum, tin, strontium, titanium, vanadium, and zinc, each of the repeating units of A and B are randomly connected, a and b are each independently 10 to 90 mol%, and 1<n<1000.

3. The modified blowing agent of claim 1, wherein the amount of the metallic siloxylated compound is from 0.1 to 10 parts by weight based on 100 parts by weight of the blowing agent.

4. The modified blowing agent of claim 1, wherein the blowing agent is at least one compound selected from the group consisting of azo dicarbon amide, p,p'-oxybis(benzenesulfonyl hydrazide), p-toluenesulfonyl hydrazide, benzenesulfonyl hydrazide, N,N'-dinitroso pentamethylene tetramine, p-toluenesulfonyl semicarbazide, 5-phenyltetrazol, sodium bicarbonate, zinc dibenzenesulfinate and zinc ditoluenesulfinate.

5. The modified blowing agent of claim 1, wherein the modified blowing agent further comprises fumed silica.

* * * * *